(12) United States Patent
Xu et al.

(10) Patent No.: US 8,444,233 B2
(45) Date of Patent: May 21, 2013

(54) ELECTRONIC DEVICE WITH A RESILIENT BRACKET

(75) Inventors: Li-Fu Xu, Shenzhen (CN); Zhi-Guo Zhang, Shenzhen (CN); Chao Geng, Shenzhen (CN); Jun-Pu Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/155,543

(22) Filed: Jun. 8, 2011

(65) Prior Publication Data
US 2012/0104910 A1 May 3, 2012

(51) Int. Cl.
A47B 81/00 (2006.01)
F21V 21/00 (2006.01)
H01R 13/73 (2006.01)

(52) U.S. Cl.
USPC ............ 312/223.2; 248/225.21; 439/565

(58) Field of Classification Search ........... 312/223.2, 312/223.5; 248/225.21, 224.8, 27.3; 24/458; 439/555, 557, 565, 567
See application file for complete search history.

(56) References Cited

U.S. PATENT DOCUMENTS

| | | | | |
|---|---|---|---|---|
| 4,541,036 A * | 9/1985 | Landries et al. | ............. | 361/823 |
| 4,990,094 A * | 2/1991 | Chandler et al. | ............. | 439/108 |
| 5,232,185 A * | 8/1993 | Schorr et al. | ................. | 248/27.3 |
| 5,451,021 A * | 9/1995 | Ripley | ......................... | 248/27.3 |
| 5,575,673 A * | 11/1996 | Dahlem et al. | ............. | 439/248 |
| 5,800,208 A * | 9/1998 | Ishizuka et al. | ............. | 439/557 |
| 5,863,016 A * | 1/1999 | Makwinski et al. | .......... | 248/27.1 |
| 6,012,947 A * | 1/2000 | Zann et al. | ................. | 439/557 |
| 6,176,738 B1 * | 1/2001 | Consoli et al. | .............. | 439/545 |
| 6,234,593 B1 * | 5/2001 | Chen et al. | ................ | 312/223.2 |
| 6,312,285 B1 * | 11/2001 | Berg et al. | ..................... | 439/545 |
| 6,579,111 B2 * | 6/2003 | Fukamachi | ................... | 439/247 |
| 7,208,686 B1 * | 4/2007 | Chen et al. | .................... | 174/561 |
| 7,338,140 B1 * | 3/2008 | Huang et al. | .............. | 312/223.2 |
| 7,553,188 B2 * | 6/2009 | Whiteman et al. | ....... | 439/607.01 |
| 7,789,701 B2 * | 9/2010 | Murr et al. | .................... | 439/552 |
| 2001/0025909 A1 * | 10/2001 | Sawayanagi | ............ | 248/292.13 |
| 2001/0027039 A1 * | 10/2001 | Okabe et al. | .................. | 439/79 |
| 2001/0053623 A1 * | 12/2001 | Fukamachi | ................... | 439/247 |
| 2003/0089834 A1 * | 5/2003 | Hough | .......................... | 248/539 |
| 2004/0160713 A1 * | 8/2004 | Wei | ................................ | 361/62 |
| 2008/0135690 A1 * | 6/2008 | Chen et al. | ................... | 248/27.1 |
| 2008/0135715 A1 * | 6/2008 | Chen et al. | .................... | 248/544 |
| 2008/0214046 A1 * | 9/2008 | Sugii et al. | .................... | 439/567 |
| 2009/0086390 A1 * | 4/2009 | Huang | ............................ | 361/49 |
| 2009/0174204 A1 * | 7/2009 | Robertson | ................... | 296/1.08 |

(Continued)

*Primary Examiner* — David Dunn
*Assistant Examiner* — Ryan A Doyle
(74) *Attorney, Agent, or Firm* — Altis Law Group, Inc.

(57) ABSTRACT

An electronic device includes a chassis and a bracket. An opening is defined in the chassis. The opening has a first side edge and a second side edge located at opposite sides thereof. A length of the second side edge is greater than that of the first side edge. The bracket is mounted in the opening. The bracket includes a pair of first hooks and a pair of second hooks at opposite sides thereof. A distance between the pair of first hooks corresponds to the length of the first side edge. A distance between the pair of second hooks corresponds to the length of the second side edge. The pair of first hooks is engaged into the opening along the first side edge. The pair of second hooks is engaged into the opening along the second side edge.

2 Claims, 5 Drawing Sheets

U.S. PATENT DOCUMENTS

| | | | |
|---|---|---|---|
| 2009/0264014 A1* | 10/2009 | Duesterhoeft | 439/545 |
| 2010/0248536 A1* | 9/2010 | Ushiro et al. | 439/557 |
| 2010/0294896 A1* | 11/2010 | Sayilgan | 248/73 |
| 2011/0051339 A1* | 3/2011 | Wang et al. | 361/679.02 |
| 2011/0084509 A1* | 4/2011 | Jones | 296/24.34 |
| 2011/0290783 A1* | 12/2011 | Geiger et al. | 219/452.12 |
| 2012/0039020 A1* | 2/2012 | Mathers et al. | 361/632 |
| 2012/0075786 A1* | 3/2012 | Hsieh et al. | 361/679.02 |
| 2012/0161973 A1* | 6/2012 | Hsu | 340/584 |

* cited by examiner

ELECTRONIC DEVICE WITH A RESILIENT BRACKET

BACKGROUND

1. Technical Field

The present disclosure relates to an electronic device with a power switch module.

2. Description of Related Art

Computers usually include a chassis and a power switch module attached to the chassis. The power switch module includes a bracket, a switch member held by the bracket, and a light emitting diode (LED) held by the bracket. The switch member is configured to allow users to power on or off the computer. The LED is configured to indicate an on/off state of the computer. An opening is defined in the chassis for mounting the bracket. The bracket includes a pair of hooks disposed at opposite sides. The pair of hooks engages with opposite side edges of the opening for securing the bracket. However, the pair of hooks is often symmetrical which cause the bracket to be easily mounted in the opening at an incorrect direction opposite to a desired direction.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
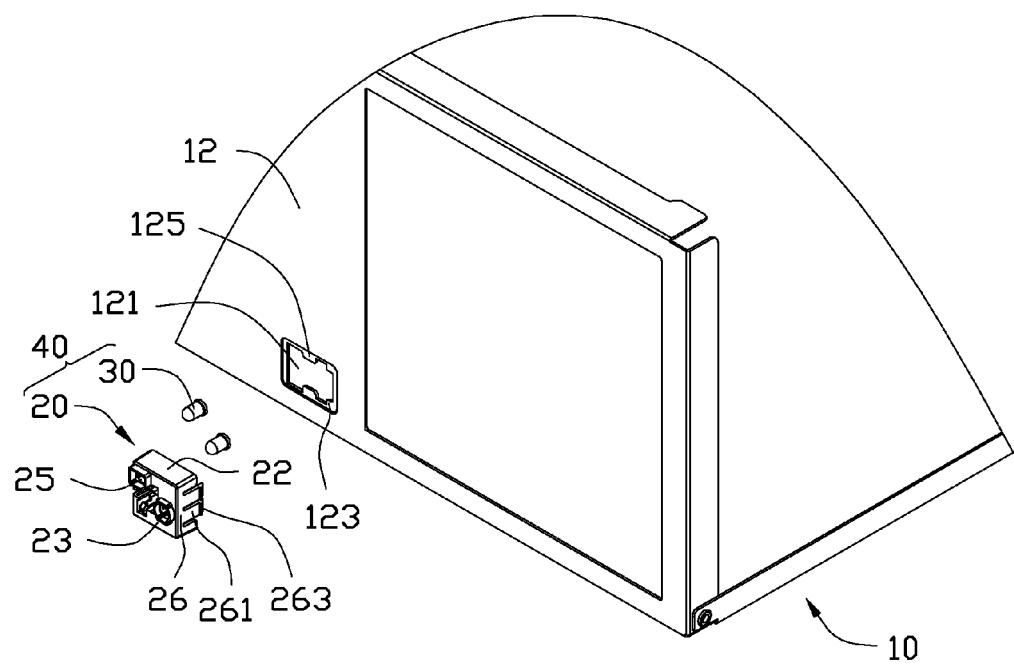
FIG. 1 is an exploded view of an electronic device according to an embodiment.
Figure 2:
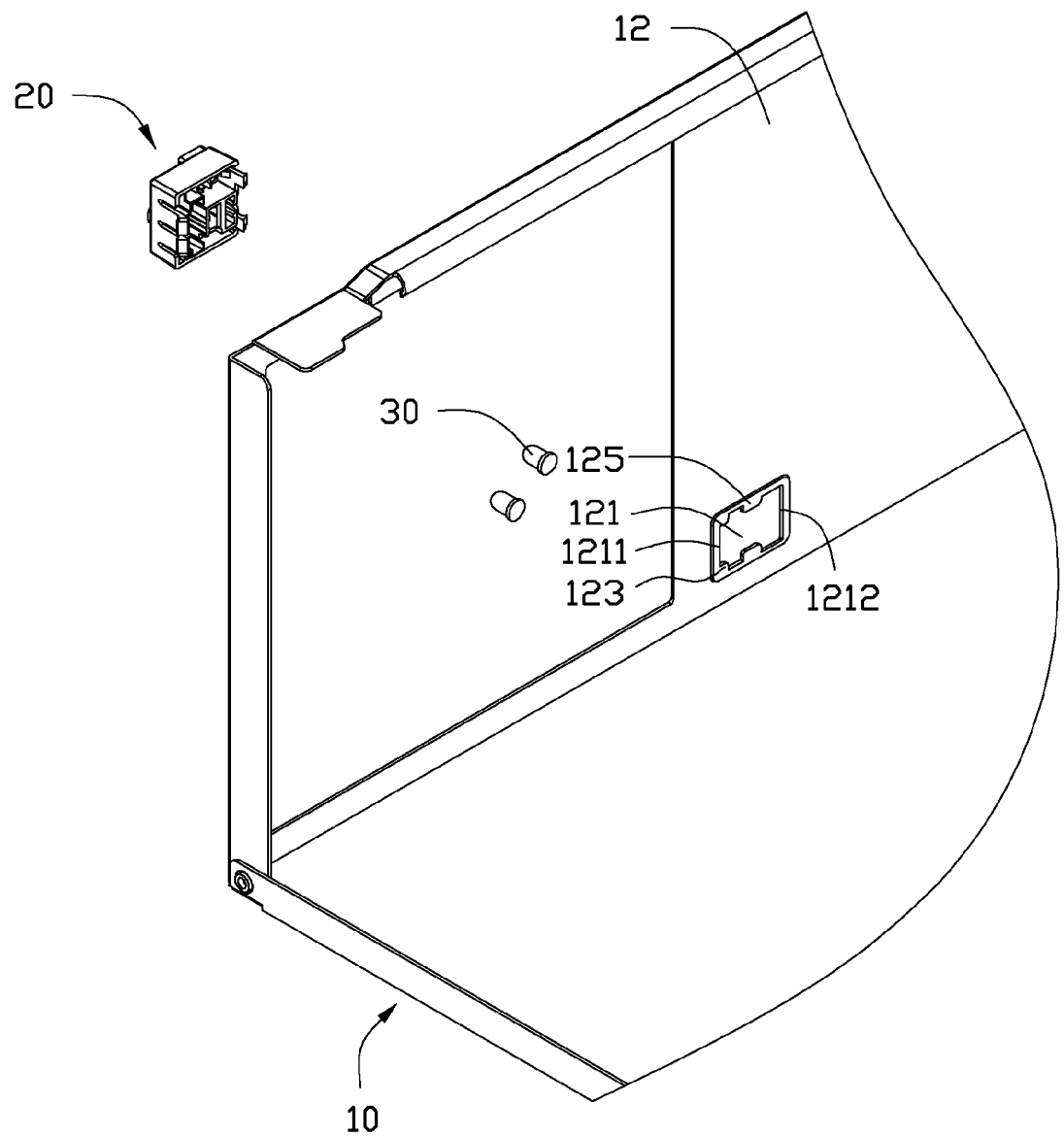
FIG. 2 is similar to FIG. 1, but viewed from another aspect.

Referring to FIGS. 1 and 2, an embodiment of an electronic device includes a chassis 10 and a power switch module 40. The power switch module 40 includes a mounting bracket 20 and a pair of LED lamps 30. The mounting bracket 20 is configured to hold a switch member (not shown) and the pair of LED lamps 30. In one embodiment, the electronic device is a computer.

The chassis 10 includes a front panel 12. An opening 121 is defined in the front panel 12 corresponding to the mounting bracket 20. The opening 121 has a substantially rectangular shape. A distance between left and right side edges of the opening 121 is greater than that between upper and lower edges of the opening 121. The opening 121 has a first side edge 1211 and a second side edge 1212 located at opposite sides thereof. A length of the second side edge 1212 is greater than that of the first side edge 1211. A pair of protruding pieces 123 is defined at a pair of corners of the opening 121 at the first side edge 1211. A pair of block pieces 125 protrudes from upper and lower edges of the opening 121.

Figure 3:
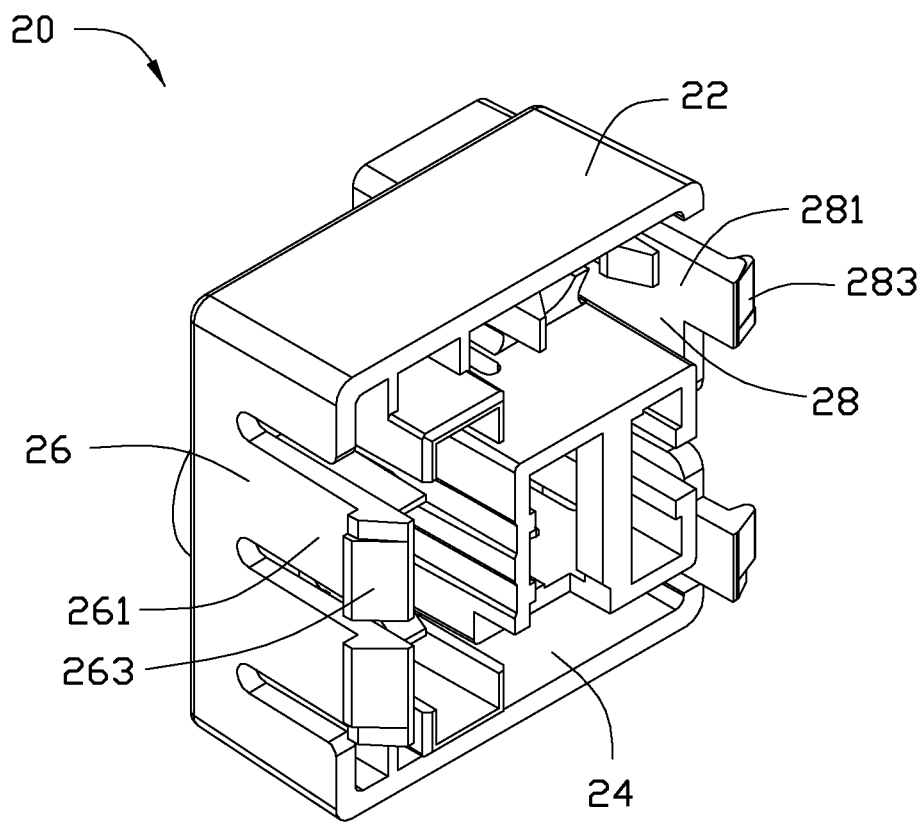
FIG. 3 is an enlarged view of a mounting bracket of FIG. 2.

Referring to FIG. 3, the mounting bracket 20 includes a top plate 22, a base plate 24 parallel to the top plate 22, a first side wall 26, and a second side wall 28 parallel to the first side wall 26. The first side wall 26 and the second side wall 28 are located between the top plate 22 and the base plate 24. A distance between the top plate 22 and the base plate 24 is less than the distance between the first side wall 26 and the second side wall 28. The distance between the first side wall 26 and the second side wall 28 is substantially equal to the length of the opening 121. A pair of first resilient arms 261 extends from the first side wall 26. A first hook 263 protrudes from a distal end of each of the pair of first resilient arms 261. A pair of second resilient arms 281 extends from the second side wall 28. A second hook 283 protrudes from a distal end of each of the pair of second resilient arms 281. A distance between the pair of second resilient arms 281 is greater than that between the pair of first resilient arms 261. A first mounting slot 23 and a second mounting slot 25 are defined in the mounting bracket 20 for mounting the pair of LED lamps 30 (see FIG. 1). The first mounting slot 23 and the second mounting slot 25 are adjacent to a pair of diagonal corners of the mounting bracket 20.

Figure 4:
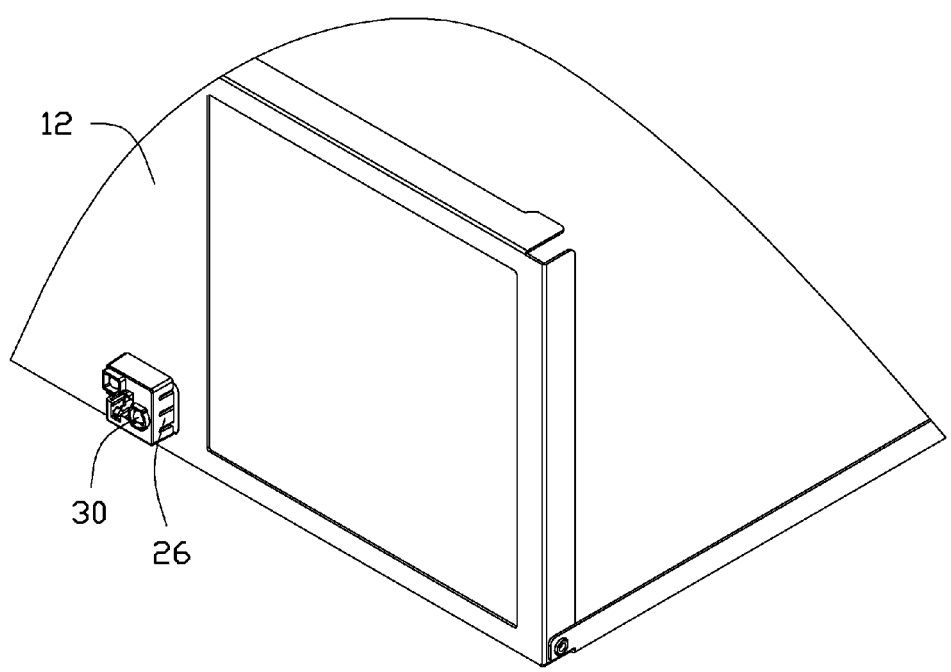
FIG. 4 is an assembled view of the electronic device of FIG. 1.
Figure 5:
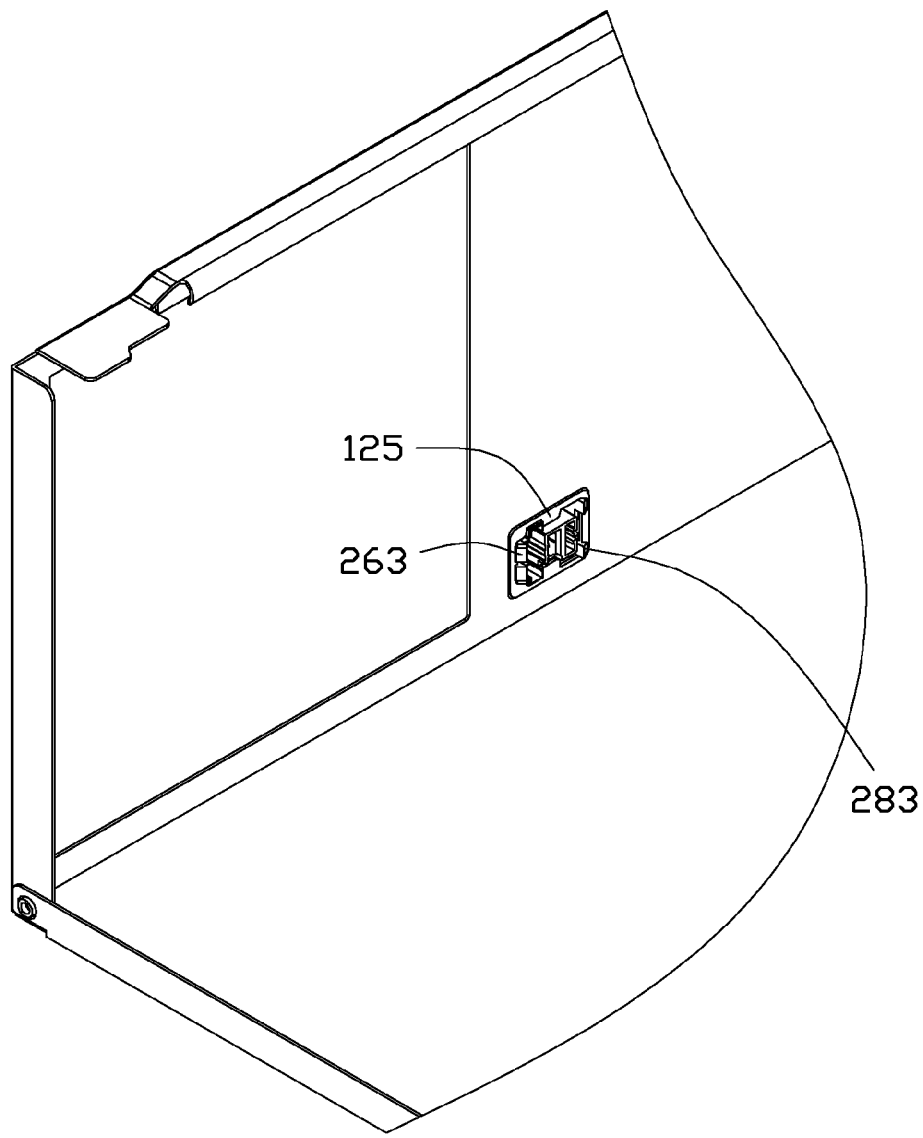
FIG. 5 is similar to FIG. 4, but viewed from another aspect.

Referring to FIGS. 4 and 5, in assembly, the pair of LED lamps 30 are mounted in the first mounting slot 23 and the second mounting slot 25. The pair of first resilient arms 261 extends into the opening 121 along the first side edge 1211 of the opening 121. The first hooks 263 clamp an interior surface of the front panel 12 for preventing the mounting bracket 20 from moving outward from the opening 121. The pair of second resilient arms 281 extends into the opening 121 along the second side edge 1212 of the opening 121. The second hooks 283 clamp the interior surface of the front panel 12 for preventing the mounting bracket 20 from moving outward from the opening 121. The top plate 22 and the base plate 24 abut outer surfaces of the pair of block pieces 125. The pair of first resilient arms 261 is located between the pair of protruding pieces 123 and abuts the pair of protruding pieces 123. The pair of second resilient arms 281 abuts the upper and lower edges of the opening 121. Thus, the mounting bracket 20 cannot move upwards or downwards. Then the power switch module 40 is secured to the chassis 10.

The mounting bracket 20 can be only mounted into the opening 121 at a single desired position where the pair of first resilient arms 261 aligns with the first side edge 1211 of the opening 121 and the pair of second resilient arms 281 aligns with the second side edge 1212 of the opening 121. Thus, the electronic device of the present disclosure utilizes the above described structure to prevent incorrect insertion of the mounting bracket 20.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. An electronic device comprising:
   a chassis with an opening defined therein, the opening having a first side edge and a second side edge located at opposite sides of the opening, and a length of the second side edge being greater than that of the first side edge; and a bracket, mounted in the opening, comprising a pair of first hooks and a pair of second hooks; the pair of first hooks are located at a first side of the bracket, and the pair of second hooks are located at a second side of the bracket that is opposite to the first side; a first distance between the pair of first hooks corresponding to the length of the first side edge; and a second distance between the pair of second hooks corresponding to the length of the second side edge; wherein the pair of first hooks is engaged with the first side edge of the opening, and the pair of second hooks is engaged with the second side edge of the opening; the bracket further comprises a first side wall, a second side wall opposite to the first side wall, a pair of first resilient arms extending from the first side wall, and a pair of second resilient arms extending from the second side wall; the pair of first resilient arms lay substantially in the same plane as the first side wall, and the pair of second resilient arms lay substantially in the same plane as the second side wall; the pair of first hooks is protruded towards the first side edge from distal ends of the pair of first resilient arms; and the pair of second hooks is protruded towards the second side edge from distal ends of the pair of second resilient arms; a third distance between the first side wall and the second side wall is substantially equal to a fourth distance between the first side edge and the second side edge; a pair of protruding pieces protrudes from two corners of the opening at the first side edge, and the pair of first resilient arms is located between the pair of protruding pieces and abuts the pair of protruding pieces; the pair of second resilient arms abuts an upper edge and a lower edge of the opening; a pair of block pieces protrudes from the upper and the lower edges of the opening, and the bracket abuts the pair of block pieces.

2. An electronic device comprising:

a chassis having an opening defined therein, the opening having a first side edge, a second side edge opposite to the first side edge, an upper edge, and a lower edge opposite to the upper edge; a length of the second side edge being greater than that of the first side edge, and a first distance between the first side edge and the second side edge being greater than a second distance between the upper edge and the lower edge;

a bracket, mounted in the opening, comprising a pair of first hooks and a pair of second hooks, the pair of first hooks located at a first side of the bracket, and the pair of second hooks located at a second side of the bracket that is opposite to the first side; a third distance between the pair of first hooks corresponding to the length of the first side edge; and a fourth distance between the pair of second hooks corresponding to the length of the second side edge;

wherein the pair of first hooks is engaged with the first side edge, and the pair of second hooks is engaged with the second side edge; the bracket further comprises a first side wall, a second side wall opposite to the first side wall, a pair of first resilient arms extending from the first side wall, and a pair of second resilient arms extending from the second side wall; the pair of first resilient arms lay substantially in the same plane as the first side wall, and the pair of second resilient arms lay substantially in the same plane as the second side wall; the pair of first hooks is protruded towards the first side edge from distal ends of the pair of first resilient arms; and the pair of second hooks is protruded towards the second side edge from distal ends of the pair of second resilient arms; a fifth distance between the first side wall and the second side wall is substantially equal to the first distance between the first side edge and the second side edge; a pair of protruding pieces protrudes from two corners of the opening at the first side edge, and the pair of first resilient arms is located between the pair of protruding pieces and abuts the pair of protruding pieces; the pair of second resilient arms abuts the upper edge and the lower edge of the opening; a pair of block pieces protrudes from the upper edge and the lower edge of the opening, and the pair of block pieces abuts the bracket.

\* \* \* \* \*